United States Patent [19]

Weber

[11] 4,431,276
[45] Feb. 14, 1984

[54] SPECIMEN-HOLDER SYSTEM FOR UPRIGHT MICROSCOPES

[75] Inventor: Klaus Weber, Konigsbronn, Fed. Rep. of Germany

[73] Assignee: Carl-Zeiss-Stiftung, Heidenheim/Brenz, Oberkochen, Fed. Rep. of Germany

[21] Appl. No.: 206,083

[22] Filed: Nov. 12, 1980

[30] Foreign Application Priority Data

Nov. 17, 1979 [DE] Fed. Rep. of Germany ....... 2946544

[51] Int. Cl.³ .......................................... G02B 21/26
[52] U.S. Cl. ................................... 350/529; 356/244; 350/447
[58] Field of Search ................................... 350/86–95, 350/46, 47, 8, 414, 447, 529; 356/244

[56] References Cited

U.S. PATENT DOCUMENTS

| | | | |
|---|---|---|---|
| 1,002,910 | 9/1911 | Foote | 350/95 |
| 1,836,915 | 12/1931 | George | 350/95 |
| 2,508,413 | 5/1950 | Massinger | 350/87 |
| 3,442,594 | 5/1969 | Minard et al. | 350/86 |
| 3,563,186 | 2/1971 | Piper | 350/86 |
| 3,572,888 | 3/1971 | Kawashima | 350/86 |
| 3,620,596 | 11/1971 | Binnings | 350/95 |
| 3,848,962 | 11/1974 | Nelson | 350/86 |
| 4,189,953 | 2/1980 | Volk | 350/86 |

FOREIGN PATENT DOCUMENTS

| | | | |
|---|---|---|---|
| 669751 | 1/1937 | Fed. Rep. of Germany | 350/86 |
| 642659 | 3/1937 | Fed. Rep. of Germany | 350/86 |
| 1030286 | 3/1953 | France | 350/86 |
| 1166726 | 11/1958 | France | 350/92 |
| 247551 | 11/1969 | U.S.S.R. | 350/90 |

Primary Examiner—Jon W. Henry
Attorney, Agent, or Firm—Hopgood, Calimafde, Kalil, Blaustein & Judlowe

[57] ABSTRACT

The invention contemplates an upright microscope construction and a system of interchangeable specimen holders for selective use therewith, to accommodate a variety of types and sizes of specimens, such that, whatever the inserted specimen-bearing holder, the specimen surface to be observed, whether by transmitted light or by reflected light, will be in focus, i.e., in the focal plane or effectively in the focal plane of the microscope. This result is achieved by building into the microscope stage a reference-abutment surface having a predetermined relation to the focal plane of the microscope, and by devising all holders of the interchangeable system to support their intended kinds of specimens in such relation to the part of the holder which abuts the reference-abutment surface, that the inserted holder places the desired specimen surface in the focal plane of the microscope.

11 Claims, 9 Drawing Figures

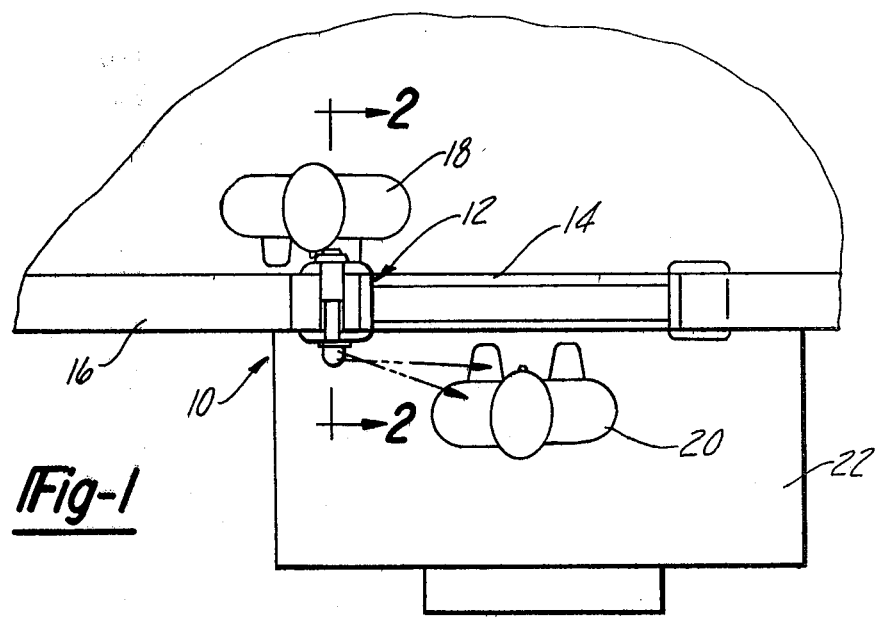
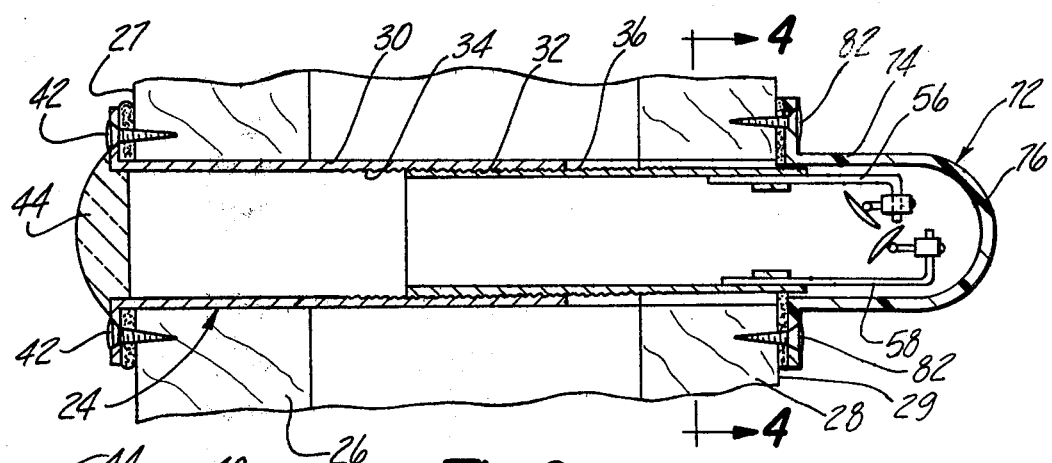
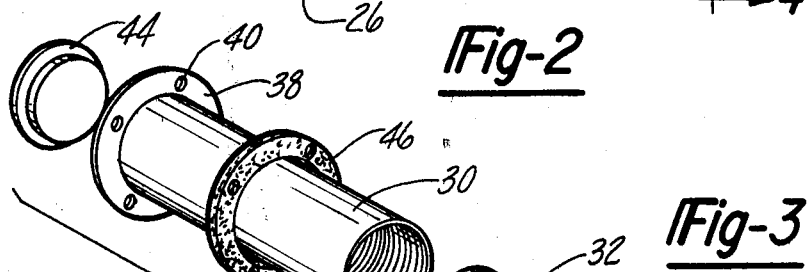
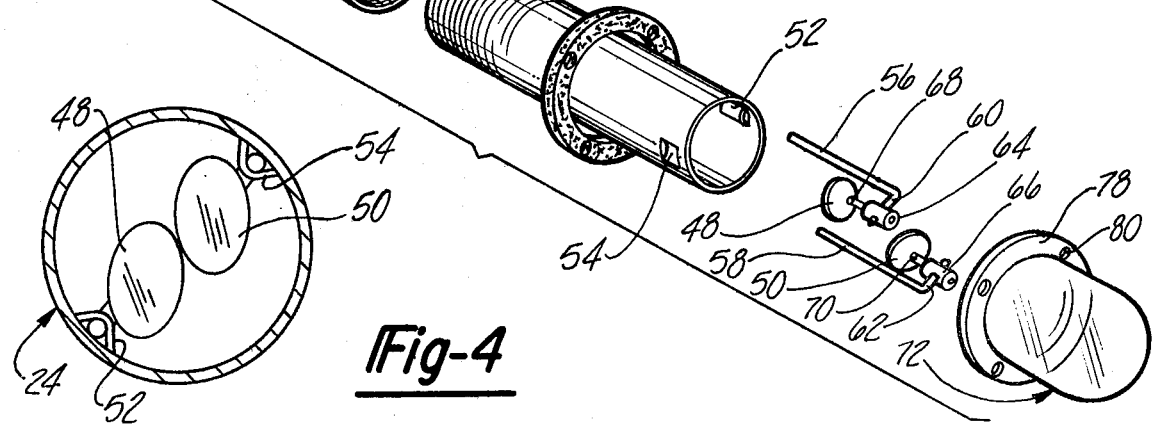

SPECIMEN-HOLDER SYSTEM FOR UPRIGHT MICROSCOPES

BACKGROUND OF THE INVENTION

The present invention relates to a specimen-holder system for upright microscopes.

Upright microscopes used at the present time have a stage upon the surface of which the specimen to be examined is placed and which is generally displaceable, for focusing purposes, in the direction of the optical axis. For this purpose, two separate adjustments, a so-called coarse adjustment and a so-called fine adjustment, are required in order, on the one hand, to adapt the focal plane to greatly varying dimensions of the specimens and, on the other hand, to permit accurate focusing in the range of high magnification.

Since coarse and fine adjustments are effected coaxially, this focusing mechanism is relatively expensive to manufacture, particularly if value is placed on high stability of the stage. Manipulations of the specimen or displacements of the specimen upon scanning should cause the specimen to migrate as little as possible out of the focal plane of the microscope.

In inverse-type microscopes, the specimens to be examined are placed almost generally on a fixed stage so that the surface of the specimen in the case of reflected-light specimens always falls in the focal plane of the microscope. For small focusing strokes, merely a fine adjustment is required, whereby the lens turret can be displaced vertically.

This has the disadvantage that the user cannot directly observe the specimen surface which is being examined at the time, as is for instance very useful when seeking specimen regions of interest. When operating with oil immersion, the oil must be applied to the downward-facing preparation-side of the specimen slide and therefore, upon scanning of the specimen, the oil easily flows into the mechanism of preparation protection of the objective lens.

The focusing by displacement of the lens turret which is known in inverse-type microscopes cannot be applied directly to upright microscopes since larger focusing strokes (such as are required to enable examination of specimens of different dimensions) require the use of a special optical system. With the lenses widely used up to the present time, and designed for a finite tube length, only slight focusing strokes can be effected without negatively affecting the quality of the intermediate image.

West German Pat. No. 2,449,291 discloses a device for applying specimen slides to microscopes. The device consists of a fixed stage against the lower edge of which standardized transmitted-light specimen slides can be applied by means of a suction unit; as a result, specimen planes of the specimens always agree with the focal plane of the microscope used. Aside from the fact that this device requires a vacuum conduit, which is not available in the case of simple microscopes, other specimens, for instance reflected-light specimens of different dimensions, cannot be used in this apparatus. Even examinations of blood-count chambers, which are frequently viewed in clinical operations alternately with standard specimen slides, cannot be carried out on this apparatus since normal blood-count chambers differ in all dimensions (i.e., thickness, cover-glass thickness, width, length) from the corresponding values for standard specimen slides.

West German utility model Pat No. 1,973,676 discloses a so-called auto-levelling stage for reflected-light specimens; this auto levelling stage is placed on the actual stage of an upright microscope and within it specimens of different thickness are pressed, in each case by spring force, against the lower side of an annular diaphragm. With such auto-levelling stages, the specimen plane is moved upward by a constant amount, namely the height of the auto-levelling stage, and remains the same for all specimens which vary within the height of the auto-levelling stage. Of course, the use of this auto-levelling stage is possible only on microscopes which have a coarse adjustment or some other stage adjustment by which the focal plane of the microscope can be readjusted by that amount which corresponds to the displacement of the specimen plane which is attributable to the height of the auto-levelling stage.

GENERAL STATEMENT OF THE INVENTION

The object of the present invention is to provide a specimen-holder system for upright microscopes by means of which a plurality of specimens of different dimensions can be examined on a microscope, without loss of focus by reason of change of the specimen.

The invention achieves this object by establishing, as a fixed or integral part of an upright microscope (or of its stage), a reference-abutment surface for any given specimen holder, which holder is one of a plurality within a specimen-holder system, for specimens of different dimensions. Within the specimen-holder system, each specimen holder is so dimensioned as a function of the specimens with which it is to be used that the specimen surface to be examined always is at the same effective distance from the reference-abutment surface of the specimen holder, said distance corresponding to the distance of the focal plane of the microscope from the reference-abutment surface of the receiver in the stage.

With such a specimen-holder system, coarse adjustment of the microscope used for the examination can be dispensed with; thus, instead of an expensively constructed and high-priced focusing mechanism, the specimen-holder system provides a plurality of holders adapted to the specimens to be examined. Significantly, after a change of specimen, the image of the next preparation is immediately visible, even in the case of preparations of different thickness. After insertion of the holder, the user can therefore limit himself to a few further manipulations for the examination and does not have to effect a time-consuming search for the focal plane by the customary means of coarse adjustment and fine adjustment.

In clinical use of the invention, it is advantageous to provide holders for blood-count chambers into which the chambers are so cemented that the effective object plane coincides with the upper edge of the holder. The latter has the same outside dimensions as standard specimen slides and is placed like the latter against a lower edge of the stage which lies, for instance, in the focal plane of the microscope. In this connection, it must be borne in mind that the greater thickness of cover glasses for blood-count chambers (0.3 mm) as compared with that of cover glasses for standard specimen slides (0.17 mm) is in itself sufficient to cause a defocusing of the image when viewed through lenses having a large magnification. The real object plane should therefore lie below the upper edge of the specimen holder by the difference in the cover-glass thicknesses corrected in accordance with the difference in refractive indices between the cover glass and air, namely:

$$(0.3 \text{ mm} - 0.17 \text{ mm}) \cdot \frac{1.51 - 1}{1.51} = 0.043 \text{ mm}$$

By applying a specimen holder against a stage lower-edge which lies in the focal plane, variations in the specimen-slide thickness (ordinary specimen slides are between 0.9 and 1.3 mm in thickness, and blood-count chambers are 3 to 6 mm thick) are without effect on the sharpness of the image. In prior microscopes, damage to the lens or to the specimen slide was always possible upon insertion of thicker specimen slides placed in the traditional manner on the microscope stage or upon the subsequent coarse-adjustment search for the focal plane, and such damage could be avoided only by expensive protection of the preparation in the form of a spring-loaded lens mount; the possibility of such damage is specifically avoided when using the specimen-holder system of the invention, and differences in thickness of the specimen slides make themselves noticeable only indirectly on the illumination side. In the traditional placement of a specimen slide on the microscope stage, differences in thickness of the specimen slides cause a defocusing of the field diaphragm which, for instance after the application of a 3-mm thick blood-count chamber, lies about 2 mm below the object plane and may make readjustment necessary; but when using holders in which the surfaces of the blood-count chambers are kept "in focus", the field diaphragm is defocused, in accordance with the difference in indices of refraction between glass and air, merely by about one-third of the amount (0.65 mm). The 2-mm smaller distance to the condenser is not a disturbing factor for condensers of long back focus.

Complete elimination of all aberrations in the illumination ray path can be obtained if, together with the specimen-holder system of the invention, one uses a condenser which contains a removable plane-parallel plate arranged on the object side, such plate being included in the calculation of the condition of correction of the condenser, and the thickness of such plate corresponding to the difference in thickness between the standard specimen slide and the blood-count chamber (2 mm). If blood-count chambers are to be observed, this plate is removed from the condenser and replaced, in a manner not distinguishable for the illumination ray path, by the greater thickness of the blood-count chamber; at the same time, the problems of too small a working distance between condenser and blood-count chamber are thereby avoided.

In order to facilitate introduction of the specimen slides, it is advantgeous to provide, in the receiver of the stage, a receiving frame which is guided for horizontal displaceability. Specimen slides or blood-count chambers cemented in specimen holders can be inserted in such a receiving frame and then be positioned by pushing the frame into a fork-shaped stage. The stage has springs which are so developed that the receiving frame, upon insertion, is pressed with preloaded force, with the specimen slide against the lower edge (the reference abutment) of the stage. In this way, canting or jamming is avoided upon introduction of the specimen slide, which generally has rather sharp edges.

The stage which contains the receiver for the specimen slide or specimen holder may be either a mechanical (cross-slide) stage or a glide stage in order to permit a scanning of the preparations.

With a system comprising specimen holders, in which transparent specimens are so mounted that their upper surface coincides with the upper edge of the holder, and corresponding receivers in the microscope stage lying in the focal plane of the microscope, an instrument can be designed for use in clinical microscopy, which does not need any coarse focussing adjustment. Specimen holders which always place the surface of the specimen in the focal plane of the microscope are, however, not limited to such use.

Frequently, microscopic specimens are examined whose dimensions remain at all times constant within a large number of specimens and which differ merely from series to series. As an example, mention may be made of silicon wafers and masks for exposing given structures on these wafers in the electronics industry. The difference in thickness of masks and wafers or of wafers and masks of different series has always made a refocussing necessary, upon change of the specimens being examined. The feeding of such specimens has presented problems, in that, with only a slight working distance between lens and specimen, an improper feeding of a thicker specimen can result in damage to the lens or to the specimen.

On the other hand, with the invention it is both possible and advantageous to provide different slide frames whose depth corresponds in each case to the very precisely maintained standard thicknesses of the specimens of the series in question. After insertion of the specimens, the frames are pushed inward in the microscope stage and, as already described, applied against a stage lower edge (the reference abutment) which is located in the focal plane of the microscope. In this way, scratching of edge regions of the specimen surface is avoided, an important factor in the examination of wafers.

It is also advisable in the case of specimens of variable, non-predictable thickness to use a frame of variable depth as the specimen holder. Such a frame may consist of two parts which are displaceable with respect to each other in frictional engagement, the upper part frame having an edge intended for application against the reference-abutment of the stage, and the lower frame part bearing the specimen. Reflected-light specimens can be pressed into non-elastic material on the bottom of the receiver frame, by pressing them with the frame against a flat surface. The depth of the frame is in this connection reduced until the specimen has been sufficiently pressed into the non-elastic material. The surface of the specimen then coincides with the upper edge of the frame. The frame is then ready for pressed insertion below the reference-abutment edge of the stage, in the focal plane of the associated microscope.

For reflected-light specimens of different thickness it is also advantageous to provide a receiving container which is open on one side and in which the specimen is pressed, by spring force, against the lower side of a diaphragm. The latter is so arranged in the container that the surface of the specimen always lies in the focal plane of the microscope, as is always possible by suitable selection of the distance between diaphragm and the stage resting surface (i.e., the reference-abutment surface) of the receiving container. Should there be alternating use with slide frames of fixed and variable depth as described above, the stage-resting surface and the lower edge of the diaphragm lie in one plane. With such a receiving container of the nature of the known auto-levelling state, and in contradistinction to the latter, no displacement of the surface of the specimen occurs, since the receiving container is suspended in the stage and is not placed on top of the stage, i.e., in this case also, a coarse adjustment of the microscope stage is not necessary when switching from one type of specimen holder to the other.

A stage which is to receive transmitted-light specimen slides and holders for blood-count chambers, or sliding frames and receiving containers, is advisedly open on one side to permit horizontal introduction of the specimen holders into a fork-shaped receiver part of the stage. The stage furthermore contains springs by which the specimen holders are pressed against a lower reference-abutment edge or surface, lying in the focal plane of the associated microscope.

The width of the stage fork is adapted to the specific use situation. Naturally, it is not possible to place standard transmitted-light specimen slides on stages which are designed for slide frames for reception of 4-inch wafers. This, however, does not constitute any limitation for the user since, for instance, a clinician does not operate with wafers, and no blood examinations are carried out in the electronic industry. It is therefore entirely sufficient so to determine the dimensions of stages for given fields of use that a plurality of specimens which are as a rule to be examined within the given field of use can be inserted with the corresponding holders into the receiver. The stage intended to receive the specimen holders may be in the form of a mechanical (cross-slide) stage or of a glide stage, to make possible a scanning of the specimen.

However, it has been found advisable, in particular for reflected-light specimens, to provide, instead of a displaceable stage, a stationary fork-shaped stage on which the corresponding specimen holders are placed. The specimen holders have a flat upper part which covers the fork and, in the region between the spaced legs of the fork, smaller dimensions which correspond approximately to half the space between the legs of the fork. These specimen holders can be displaced on the fork for scanning. No separate mechanical or gliding stage is therefore required. In order to permit examinations of the specimen in polarized light, the stage fork can be mounted for rotation around the optical axis of the microscope objective lens.

DETAILED DESCRIPTION

Illustrative embodiments of the invention will be described in further detail below, in reference to the accompanying drawings, in which:

FIG. 1 is a fragmentary vertical sectional view of the mounting of an ordinary transmitted-light specimen slide, for microscope viewing in accordance with the invention;

FIG. 2 is a similar view, for the mounting of a blood-count chamber;

FIG. 3 similarly shows the mounting of a transmitted-light specimen slide in an insertion frame;

FIGS. 4 and 5 respectively and similarly show the mounting of wafers and masks by means of special slide frames;

FIGS. 6 and 7 respectively and similarly show the mounting of reflected-light polished specimens of different thickness and diameter;

FIG. 8 shows a specimen holder which is horizontally displaceable on a turnable fork-shaped stage; and FIG. 9 shows a gliding stage for transmitted-light specimen slides.

In FIG. 1, an ordinary transmitted-light specimen slide 1 is provided with a cover glass 2 and is illuminated via a condenser 3 and imaged or observed via a microscope objective lens 4. The surface of the specimen slide 1 is held at all times in the focal plane 10 of lens 4 by a receiver 8 forming part of the stage of the microscope. For this purpose, the receiver 8 has two horizontally extending grooves 14 each of which carries a leaf spring 9; these springs press the horizontally inserted specimen slide 1 against the lower or reference-abutment edge 15 which is formed by the grooves 14 and which lies in the focal plane 10.

The front lens of condenser 3 consists of two parts 5 and 6, of which part 6, a plane-parallel plate, is mounted in a cap 7 and is removable. The thickness of the plane-parallel plate 6 corresponds to the difference in thickness between a standard specimen slide 1 and a blood-count chamber, such as that shown at 11 in FIG. 2. The blood-count chamber 11 is so cemented in a specimen holder 13 whose outside dimensions correspond to those of the specimen slide 1 that, with due consideration of the greater thickness of the cover glass 12 beyond that of the cover glass 2, the effective object plane corresponds to the upper edge of the specimen holder 13. The specimen holder 13 which bears the blood-count chamber 11 is inserted into the grooves 14 of the receiver 8 and is held "in focus" by springs 9, all as described for the specimen slide 1. The cap 7 of the condenser 3 (and thus the plane-parallel plate 6) is removed so that no optical-focus change has occurred as compared with FIG. 1, even with respect to the illuminating-ray path.

In FIG. 3, the part of the receiver 18 (for specimen slides 1 or blood-count chambers 11) which is shown in FIG. 3 has a laterally deeper groove 16 than in the case of groove 14 of the receiver 8 of FIG. 1; an insertion frame 17 is displaceable in the deeper groove 16. The frame 17 can be pulled out of the receiver 8 to such an extent that the specimen slide 1 can be inserted from above and into the frame 17. Upon insertion, leaf spring 19 pushes frame 17 upward and thus pushes the specimen slide 1 against the lower edge 15 of the stage, which edge lies in the focal plane 10.

FIG. 9 shows a gliding stage 58 which is suitable to receive transmitted-light specimen slides 51 or cemented blood-count chambers. As already described with reference to FIGS. 1 to 3, they are applied by springs 59 against the lower edge 55 of a groove 54. The gliding stage 58 rests on four Teflon feet 56 by which it can be placed on the surface of a flat stage firmly attached to a microscope, for scanning displacement of the specimen slide 51 on the flat stage. The surface of the stationary stage is located at the distance a below the focal plane 10 of the microscope in question, and the gliding stage 58 is so dimensioned that the reference-abutment edge 55 thereof is at the same distance a above the lower side of the feet 56. Thus, the surfaces of the specimen slides used are always in the focal plane 10 of the microscope. The gliding stage 58 furthermore is provided, below the application surface 55, with a continuous recess 52 which permits horizontal introduction of the gliding stage 58 despite the fact that the condenser 3 protrudes above the resting surface 57. Thus, the stage 58 can be replaced without having to remove the microscope objective 4.

The specimen holders shown in FIG. 4 to 7 form interchangeable elements of a push-in system adapted to receive differently shaped solids for, preferably, reflected-light observation. In FIG. 4, the surface 22 of a silicon wafer 21 is to be examined. The specimen holder is recessed a sliding frame 20 wherein the depth of the recess corresponds to the thickness of wafer 21. To receive wafers 21 from a series of different dimensions, each size is accommodated by its own corresponding one of a plurality of different sliding frame, each of which can be introduced into spaced grooves 24 of a fork-shaped receiver 28, connected to or forming part of the stage of the microscope.

FIG. 5 illustrates a specimen-holder 23 for a mask 25 which may be of the type used for exposure of the coated photosensitive surface 22 of wafer 21. The structure 26 of the mask 25 can be observed in reflected light and in transmitted light since the frame 23, in contradistinction to the frame 20, does not have a continuous bottom. In this case also, corresponding specimen holders in the form of slide frames are provided for masks of different thicknesses and dimensions.

FIG. 6 shows a two-part specimen holder for polished specimens; its parts 29 and 30 are displaceable with respect to each other in frictional engagement. In the container-shaped part 29 of the holder, there is nonelastic composition 27 into which the specimen 31 has been pressed. In this process, the surface of the holder 30 and the specimen surface to be examined are applied jointly against a flat surface. With suitable dimensioning of the parts 29 and 30, specimens of greatly differing thickness can also be mounted flush with the upper edge of the specimen holder so that their surface coincides with the focal plane 10, once holder 29–30 has been inserted into receiver 28.

In similar manner, FIG. 7 shows that the FIG. 6 result may be obtained by a receiving container 32 which is open on one side, and in which the specimen 41 (shown seated on a pad 37 of yieldable material) is pressed by a spring 36 and a plunger 40 against a diaphragm 34, the latter being seated against a shoulder within container 32 and secured by a clamping ring 35. The receiving container 32 has two external ribs or flanges 33 with which it is held in grooves 24 of the receiver 28. Upper edges of the ribs 33 lie in the same plane as the lower edge of the diaphragm 34, so that the surface of the specimen 41 lies in the focal plane 10. Since the container 32 is open on one side, it can retain its position with respect to the receiver 28 in the stage of the microscope, upon change of the specimen. A transient downward displacement of plunger 40 releases the specimen 41 for replacement, whereupon release of plunger 40 establishes the observation surface of the new specimen at the focal plane 10.

The parts of the specimen holders shown in FIGS. 4 to 7 which are adapted for introduction into the grooves 24 of the receiver 28 all have the same dimensions and are thus interchangeable and permit the observation of specimens of different dimensions while retaining the focal plane of the microscope attached to the receiver 28.

The stage which bears the receiver 28 can be designed as a mechanical stage so as to permit a scanning of the specimens. However, it is also possible to use a fixed stage or, as shown in FIG. 8, a stage which is rotatable about the optical axis and to develop the specimen holders in such manner that they can be displaced on the stage for scanning, without the specimen surface coming out of the plane of focus upon a change in specimen. For this purpose, the stage may consist of a fork-shaped stage plate 48 on a cylinder 38 which is open toward the fork opening. This cylinder is mounted for rotation, via a ball bearing 42, about the optical axis of lens 4 with respect to a base 39, firmly connected to the microscope.

In the holder of FIG. 8, a specimen 46 can, as already described in FIG. 5, be mounted via non-elastic material 47 in a specimen holder of variable depth. The holder consists of a slitted sleeve or cap 44 and slidably engaging a cylindrical mating piece 45. The diameter of the specimen holder 44–45 corresponds approximately to one-half the width of the fork opening of the stage plate 48.

The cylindrical part 45 of the specimen holder depends from a rectangular plate 43 whose thickness a corresponds to the distance of the focal plane 10 from the surface 49 of the stage plate 48. The plate 43 bears a fluting 53 by which it, and thus the specimen 46, can be readily displaced manually in the focal plane 10.

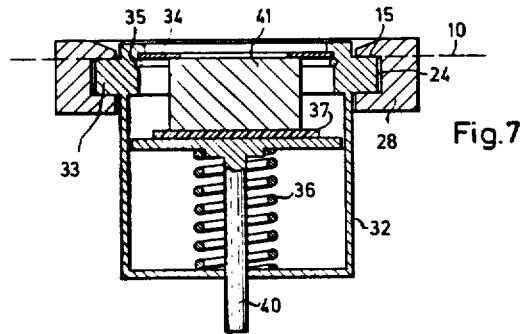

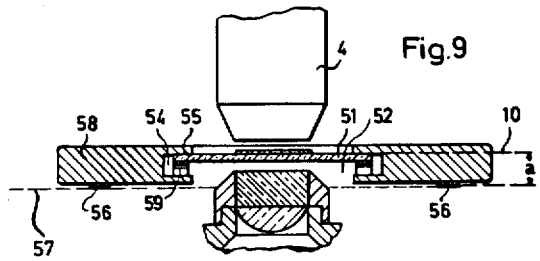

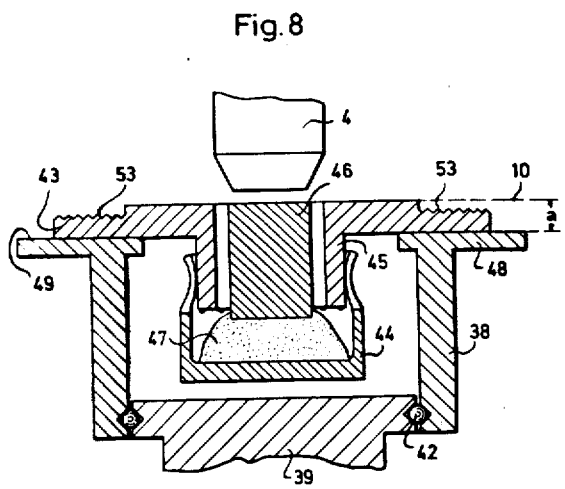

What is claimed is:

1. A specimen holder system for upright microscopes for locating the object plane of specimens of substantially different thicknesses and having different lateral dimensions in the focal plane of the microscope by means of a receiver disposed in the microscope stage, said specimens having specimen surfaces to be observed, said receiver including an object receiving surface positioned a predetermined distance from the focal plane of the microscope, a plurality of specimen holders having different inner dimensions corresponding to the respective lateral dimensions of said specimens and being provided with an edge, said edge of said holders being constructed and arranged to be disposed against said object receiving surface, the distance from specimen surfaces to said edge of said holders being the same for each holder and being the same as said predetermined distance between said object receiving surface of said receiver and the focal plane of the microscope, and an insertion frame displaceable along said object receiving surface, the edge of said object holders extending above said insertion frame, said insertion frame including biasing means urging said insertion frame towards said receiver upon insertion, so that the upper surface of the edge of said holders rests against said object receiving surface.

2. The specimen holder system of claim 1 wherein said microscope includes a horizontal surface and the receiver and the insertion frame are slidably disposable on said horizontal surface.

3. A specimen holder system for upright microscopes for locating the object plane of specimens of substantially different thicknesses and having different lateral dimensions in the focal plane of the microscope by means of a receiver disposed in the microscope stage, said specimen having specimen surfaces to be observed, said receiver comprising a pair of U-shaped channels, the open ends of said channels facing each other and the upper interior surfaces of said U-shaped channels forming an object receiving surface positioned a predetermined distance from the focal plane of the microscope, a plurality of specimen holders having different inner dimensions corresponding to the respective lateral dimensions of said specimens and being provided with an edge, said edge of said holders being constructed and arranged to be disposed against said object receiving surface, the distance from the specimen surfaces to said edge of said holders being the same for each holder and being the same as said predetermined distance between said object receiving surface of said receiver and the focal plane of the microscope, said holders being constructed as slide frames for insertion in said U-shaped channels, said slide frame having differences in depth which are the same as the difference in thickness of the specimens, and biasing means for urging said slide frame against said object receiving surface upon insertion.

4. The specimen-holder system as claimed in claim 3, wherein said slide frames include reception containers, the bottoms of said reception containers being vertically adjustable by frictional engagement.

5. The specimen-holder system as claimed in claim 3, wherein said reception containers contain non-elastic material for the press insertion of reflected-light specimens.

6. The specimen-holder system as claimed in claim 3, wherein said specimen holder further includes a reception container including a diaphragm for reflected-light specimens, the lower edge of said diaphragm being disposed in the focal plane of the microscope and biasing means for urging said specimen against said diaphragm.

7. A specimen holder system for upright microscopes, for locating the object plane of the specimens to be examined in the focal plane of the microscope said system including a receiver disposed in the microscope stage, said receiver including an object receiving surface disposed in the focal plane of the microscope and at least two different types of specimen carriers having substantially different thicknesses, one type of specimen carriers being standard transmitted light specimen slides and the other type of specimen carriers being holder means for blood count chambers, said holder means being provided with an edge, said edge being constructed and arranged to be disposed against said object receiving surface, said receiver having an insertion frame displaceable along said object receiving surface and accommodating said standard transmitted light specimen slides and said holder means for said blood count chambers, said insertion frame including biasing means urging said insertion frame against said receiver so that at least one of the upper surface of said standard specimen slides and the edge of said holder means rests against said object receiving surface.

8. The specimen holder system of claim 7 wherein said blood count chambers are positioned in said holder means so that their object plane lies a predetermined distance below said edge of said holder, said predetermined distance being equal to the difference in optical thickness between the cover glasses of said standard specimen slides and said blood count chambers.

9. The specimen holder system of claim 7 wherein said microscope includes a horizontal surface and the receiver and the insertion frame are slidably disposed on said horizontal surface.

10. The specimen holder system of claim 7 wherein said microscope includes a condensor having a removable plane parallel plate forming an object side part of the front condensor lens for the correction of same.

11. The condenser according to claim 10, wherein said microscope includes a horizontal stage plate located a fixed distance below the focal plane of the microscope, said condenser extending at least in part above said stage plate, and a gliding stage having an object receiving surface for receiving transmitted-light specimen slides, said sliding stage having feet resting on said stage plate and said object receiving surface is located at said fixed distance from said horizontal stage plate to thereby dispose said specimens in the focal plane of the microscope.

* * * * *

UNITED STATES PATENT AND TRADEMARK OFFICE
CERTIFICATE OF CORRECTION

PATENT NO. : 4,431,276                        Page 1 of 4
DATED      : February 14, 1984
INVENTOR(S) : Klaus Weber It is certified that error appears in the above-identified patent and that said Letters Patent is hereby corrected as shown below:

The title page showing the illustrative figure should be deleted to appear as per attached title page.

Figures 1 - 4 of the drawings should be deleted and Figures 1 - 9 as shown on the attached sheets substituted therefor.

Signed and Sealed this

Third Day of July 1984

[SEAL]

Attest:

Attesting Officer

GERALD J. MOSSINGHOFF

Commissioner of Patents and Trademarks

United States Patent [19]
Weber

[11] 4,431,276
[45] Feb. 14, 1984

[54] SPECIMEN-HOLDER SYSTEM FOR UPRIGHT MICROSCOPES

[75] Inventor: Klaus Weber, Konigsbronn, Fed. Rep. of Germany

[73] Assignee: Carl-Zeiss-Stiftung, Heidenheim/Brenz, Oberkochen, Fed. Rep. of Germany

[21] Appl. No.: 206,083

[22] Filed: Nov. 12, 1980

[30] Foreign Application Priority Data

Nov. 17, 1979 [DE] Fed. Rep. of Germany ....... 2946544

[51] Int. Cl.³ .................................... G02B 21/26
[52] U.S. Cl. .................................... 350/529; 356/244; 350/447
[58] Field of Search .................... 350/86–95, 350/46, 47, 8, 414, 447, 529; 356/244

[56] References Cited

U.S. PATENT DOCUMENTS

| | | | |
|---|---|---|---|
| 1,002,910 | 9/1911 | Foote | 350/95 |
| 1,836,915 | 12/1931 | George | 350/95 |
| 2,508,413 | 5/1950 | Massinger | 350/87 |
| 3,442,594 | 5/1969 | Minard et al. | 350/86 |
| 3,563,186 | 2/1971 | Piper | 350/86 |
| 3,572,888 | 3/1971 | Kawashima | 350/86 |
| 3,620,596 | 11/1971 | Binnings | 350/95 |
| 3,848,962 | 11/1974 | Nelson | 350/86 |
| 4,189,953 | 2/1980 | Volk | 350/86 |

FOREIGN PATENT DOCUMENTS

| | | | |
|---|---|---|---|
| 669751 | 1/1937 | Fed. Rep. of Germany | 350/86 |
| 642659 | 3/1937 | Fed. Rep. of Germany | 350/86 |
| 1030286 | 3/1953 | France | 350/86 |
| 1166726 | 11/1958 | France | 350/92 |
| 247551 | 11/1969 | U.S.S.R. | 350/90 |

Primary Examiner—Jon W. Henry
Attorney, Agent, or Firm—Hopgood, Calimafde, Kalil, Blaustein & Judlowe

[57] ABSTRACT

The invention contemplates an upright microscope construction and a system of interchangeable specimen holders for selective use therewith, to accommodate a variety of types and sizes of specimens, such that, whatever the inserted specimen-bearing holder, the specimen surface to be observed, whether by transmitted light or by reflected light, will be in focus, i.e., in the focal plane or effectively in the focal plane of the microscope. This result is achieved by building into the microscope stage a reference-abutment surface having a predetermined relation to the focal plane of the microscope, and by devising all holders of the interchangeable system to support their intended kinds of specimens in such relation to the part of the holder which abuts the reference-abutment surface, that the inserted holder places the desired specimen surface in the focal plane of the microscope.

11 Claims, 9 Drawing Figures

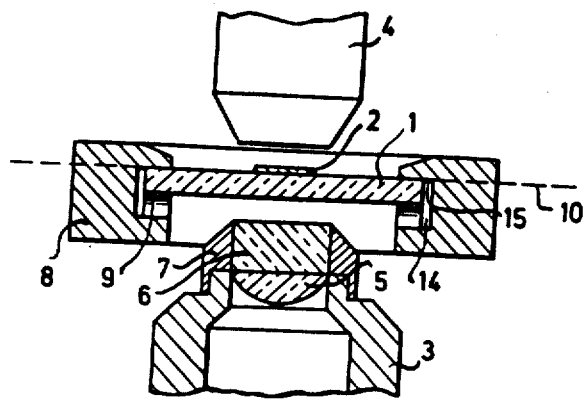

UNITED STATES PATENT AND TRADEMARK OFFICE
CERTIFICATE OF CORRECTION

PATENT NO. : 4,431,276
DATED : February 14, 1984
INVENTOR(S) : Klaus Weber

It is certified that error appears in the above-identified patent and that said Letters Patent are hereby corrected as shown below:

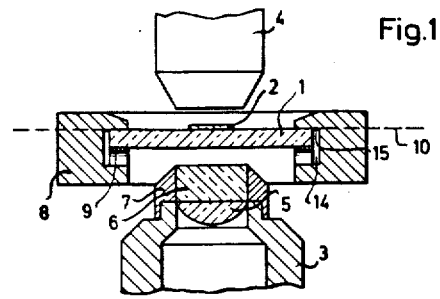
Fig.1

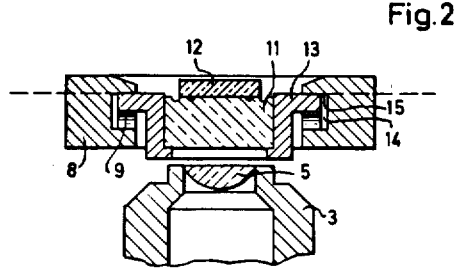
Fig.2

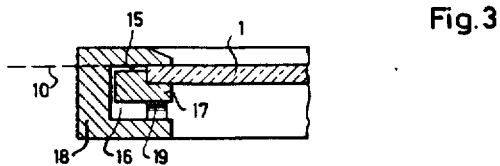
Fig.3

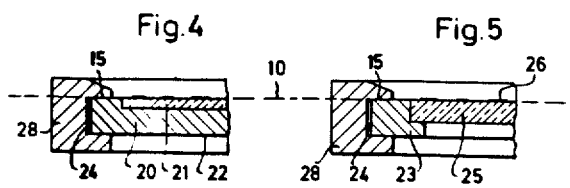
Fig.4   Fig.5

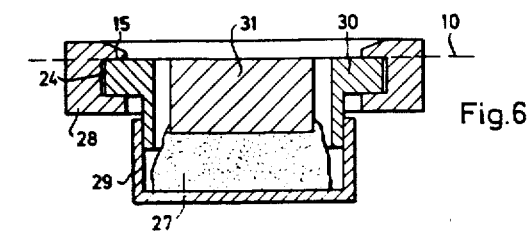
Fig.6

UNITED STATES PATENT AND TRADEMARK OFFICE
CERTIFICATE OF CORRECTION

PATENT NO. : 4,431,276  Page 4 of 4
DATED : February 14, 1984
INVENTOR(S) : Klaus Weber It is certified that error appears in the above–identified patent and that said Letters Patent are hereby corrected as shown below: